(No Model.)

O. LE G. NOBLE.
CUTTER FOR TRIMMING HEEL SEATS AND RANDS FOR BOOTS OR SHOES.

No. 605,647. Patented June 14, 1898.

WITNESSES:
A. S. Harrison
R. M. Pierson

INVENTOR:
O. L. Noble
by Wright Brown & Quimby
attys.

THE NORRIS PETERS CO., PHOTO-LITHO., WASHINGTON, D. C.

UNITED STATES PATENT OFFICE.

OSCAR LE GRAND NOBLE, OF WINTHROP, MASSACHUSETTS, ASSIGNOR TO FRANK WOOD, TRUSTEE, OF BOSTON, MASSACHUSETTS.

CUTTER FOR TRIMMING HEEL-SEATS AND RANDS FOR BOOTS OR SHOES.

SPECIFICATION forming part of Letters Patent No. 605,647, dated June 14, 1898.

Application filed January 25, 1897. Serial No. 620,670. (No model.)

*To all whom it may concern:*

Be it known that I, OSCAR LE GRAND NOBLE, of Winthrop, in the county of Suffolk and State of Massachusetts, have invented certain new and useful Improvements in Cutters for Trimming Heel-Seats and Rands for Boots or Shoes, of which the following is a specification.

This invention has relation to cutters for trimming heel-seats and rands of boots and shoes.

The object of the invention is to provide a cutter which may be used either for trimming the heel-seats or for cutting away the rand or for accomplishing both purposes at the same time, in which the cutter proper is so constructed and arranged with relation to the other parts that the cuttings are disposed of without impairing the cutting edge or preventing it from operating throughout its entire length.

One of the greatest difficulties to be met with in the employment of the ordinary rand-cutter is due to the fact that as ordinarily constructed the parts must be adjusted with great nicety, and the outlets for the cuttings are such as to cause the latter to clog and cover the cutting edges and prevent their operating to cut throughout their entire length.

Hence my invention consists of a cutting-tool of the character described having its parts constructed in the peculiar manner illustrated on the drawings and now to be described in this specification and set forth in the claim hereto appended.

Reference is to be had to the annexed drawings, and to the letters and figures marked thereon, forming a part of this specification, the same letters and figures designating the same parts or features, as the case may be, whereever they occur.

Figure 1:
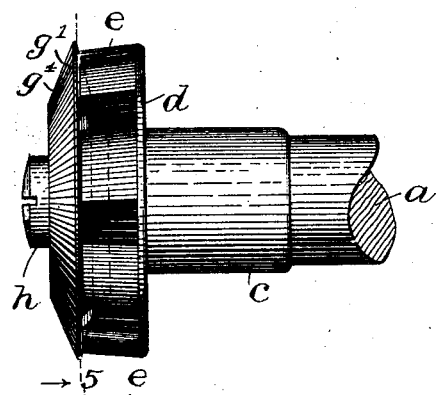
Figure 2:
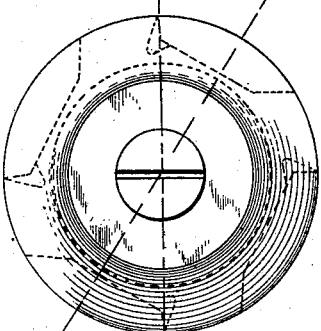
Figure 3:
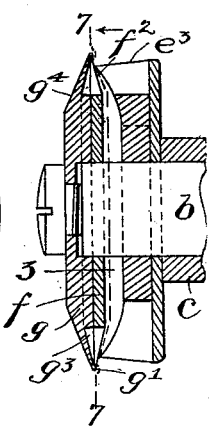
Figure 4:
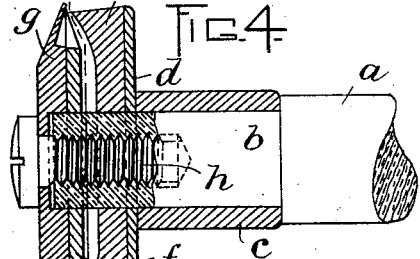
Figure 5:
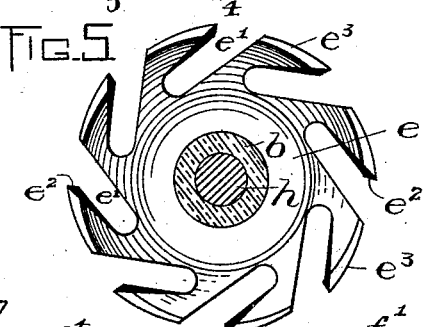
Figure 6:
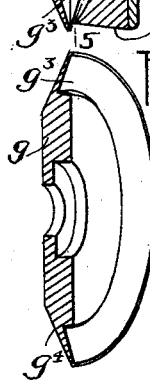
Figure 7:
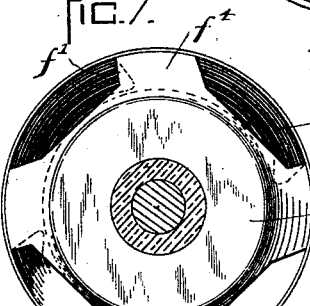
Figure 8:
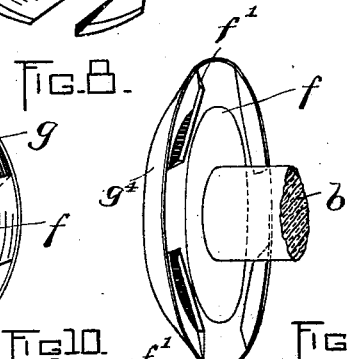
Figure 9:
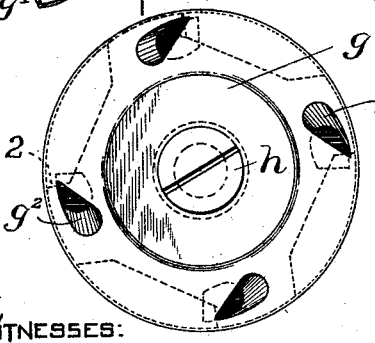
Figure 10:
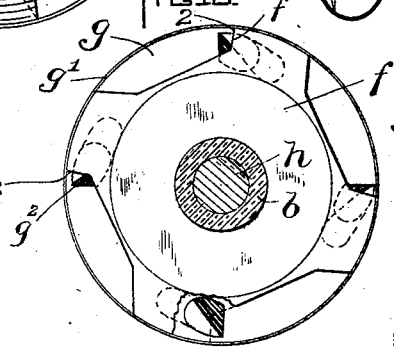
Figure 11:
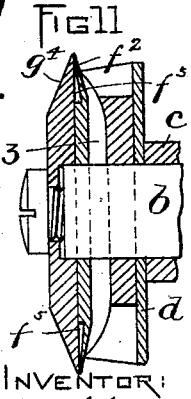

Of the drawings, Figure 1 is a side elevation of a cutting-tool constructed in accordance with my invention. Fig. 2 is a front end elevation of the same. Fig. 3 is a section on the line 3 3 of Fig. 2. Fig. 4 is a section on the line 4 4 of Fig. 2. Fig. 5 is a section on the line 5 5 of Fig. 4, showing the cutters for trimming the heel-seat. Fig. 6 is a perspective view of a half of the guard. Fig. 7 is a section on the line 5 5 of Fig. 4, looking toward the left. Fig. 8 is a perspective view of the guard and the rand-cutter. Figs. 9 and 10 illustrate the rand-cutter and guard as ordinarily constructed. Fig. 11 is a section similar to Fig. 3, but showing a slightly-different form of my invention.

As commonly constructed a tool for trimming heel seats and rands consists of a supporting-shaft $a$, having a reduced end $b$, surrounded by a sleeve $c$. On a portion of the reduced end of the shaft which projects beyond the sleeve $c$ is placed a disk $d$, the heel-seat cutter $e$, the rand-cutter $f$, and the guard or shield $g$. Usually the disk, the heel-seat cutter, and the rand-cutter are placed loosely on the shaft, while the shield or guard has an annular socket to receive the end of the reduced portion of the shaft, all of these parts being held on the shaft by a screw $h$, which is threaded into the said reduced end $b$.

In Figs. 9 and 10 I have illustrated the rand-cutter which is ordinarily employed, it being shown for the purpose of differentiating between it and my invention. In the said Figs. 9 and 10 the guard $g$ is formed with a flat inner face, with a small flange $g'$ projecting inwardly. The outer face is beveled to produce a thin edge to extend between the rand and the upper to prevent the rand-cutter from injuring the upper.

The rand-cutter $f$ is of the shape shown—that is to say, it has recesses with cutting edges $f'$—and it fits snugly within the flange $g'$ of the guard. For the purposes of disposing of the cuttings made by the edges $f'$ the guard is provided with an aperture $g^2$ for each cutting edge, said apertures being peculiarly formed and extending obliquely through the guard, so that the cuttings made by the cutting edges may pass through them. When a rand-cutter and guard of this nature are employed, they must be adjusted carefully, so that the cutting edge bears the proper relationship to the apertures for the cuttings, for otherwise the cuttings will not be discharged or removed, and, again, it is practically impossible to carry the apertures for the cuttings close enough to the edge of the guard, so as to have the width of the aperture coextensive with the length of the cutting edge, because of the danger of weakening the guard, and therefore there is a small space 2 on the cutting edge where the cuttings are apt to lodge and collect and prevent that portion from performing its function of cutting, the result being that the finished shoe is imperfectly cut and does not present a neat and tasteful appearance to the eye.

It is my object to form a guard and cutter in such way as to dispense with the apertures $g^2$ and to prevent any clogging of the cuttings, whereby the entire length of each cutting edge is unimpaired and effective. To accomplish this purpose, the guard $g$, which has a peripheral flange $g'$, is recessed, as at $g^3$, the said recess extending circumferentially around the guard just inside the flange $g'$. The rand-cutter $f$ may be constructed in the ordinary way with cutting edges $f'$, so that when the two parts are secured upon the shaft the space $g^3$ is left between the cutter-disk and the guard, and the entire length of each cutting edge is free to operate on the rand.

The heel-seat cutter, as shown in Fig. 2, has a flat inner face and is recessed at $e'$ $e'$ to provide cutting edges $e^2$, which are preferably at a slight angle to the axis of the shaft, and the faces $e^3$ taper forwardly and are slightly eccentric to provide for the free action of the said cutting edges. The forward face of the heel-seat cutter is concave, as shown in Figs. 3 and 4, so as to leave a space between it and the rear face of the rand-cutter. The beveled face $f^2$ of the said rand-cutter and the beveled portion $g^4$ of the guard form a V to enter between the rand and the upper, so as to trim and cut away the rand, the flange $g'$ and the bevel of the guard acting to prevent the cutter from defacing the upper.

The diameter of the heel-seat cutter is less than that of the rand-cutter, so that the latter projects out beyond the former a distance equal to the depth of the rand-crease. When the tool is in operation, the cuttings made by the cutting edges $f'$ enter the space between the guard and the rand-cutter and pass behind the projecting portions $f^4$ of the said cutter and pass through the recesses into the space 3, before referred to, and from thence out through the clearances or recesses $e'$ in the heel-seat cutter. Instead of forming the recess for the said cuttings in the guard it may be formed in the cutter itself, as shown in Fig. 11. In this event the rear face of the guard is flat, while the rand-cutter is cut away, as at $f^5$, to provide a clearance. Otherwise the cutter is of the shape shown in the other figures.

From the foregoing it will be seen that I provide a guard having a continual outer surface which is unbroken and the strength of which is unimpaired. The clearance or recess for the cuttings of the rand-cutter is between the latter and the guard, and there is no chance for the cuttings to collect on the end of the cutting edge and prevent it from cutting effectively throughout its entire length.

It is unnecessary to adjust the cutter relatively to the guard, since the cutter is equally effective irrespective of its position on the guard, since there are no apertures for the cuttings with which the cutting edges must register.

Having thus explained the nature of the invention and described a way of constructing and using the same, though without attempting to set forth all of the forms in which it may be made or all of the modes of its use, I declare that what I claim is—

A cutting-tool of the character described, comprising a support, a flat non-perforated guard, a flat cutting-disk abutting against the guard and having cutting edges for the rand, there being a clearance or recess between the guard and the disk, and a cutter having cutting edges for the heel-seat and having a concave inner face.

In testimony whereof I have signed my name to this specification, in the presence of two subscribing witnesses, this 19th day of January, A. D. 1897.

OSCAR LE GRAND NOBLE.

Witnesses:
 A. D. HARRISON,
 C. F. BROWN.